(12) United States Patent
Chiang et al.

(10) Patent No.: US 11,061,454 B2
(45) Date of Patent: Jul. 13, 2021

(54) POWER SUPPLY APPARATUS, BACKUP POWER MODULE AND METHOD FOR PROVIDING BACKUP POWER IN COMPUTING SYSTEMS

(71) Applicant: LENOVO ENTERPRISE SOLUTIONS (SINGAPORE) PTE. LTD., Singapore (SG)

(72) Inventors: Shih Ming Fan Chiang, Taipei (TW); Zhi Da Huang, New Taipei (TW); Chang-Hsing Lee, New Taipei (TW); Chihwei Wu, Taipei (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 174 days.

(21) Appl. No.: 16/526,466

(22) Filed: Jul. 30, 2019

(65) Prior Publication Data

US 2020/0064895 A1 Feb. 27, 2020

(30) Foreign Application Priority Data

Aug. 3, 2018 (CN) .......................... 201810876472.1

(51) Int. Cl.
| | |
|---|---|
| *G06F 1/26* | (2006.01) |
| *H02J 9/06* | (2006.01) |
| *H02J 7/00* | (2006.01) |
| *G06F 1/30* | (2006.01) |
| *G06F 13/40* | (2006.01) |

(52) U.S. Cl.
CPC ................ *G06F 1/263* (2013.01); *G06F 1/30* (2013.01); *G06F 13/4068* (2013.01); *H02J 7/0068* (2013.01); *H02J 9/061* (2013.01)

(58) Field of Classification Search
CPC ........ G06F 1/263; G06F 1/30; G06F 13/4068; H02J 7/0068; H02J 9/06; H02J 9/061
See application file for complete search history.

(56) References Cited

U.S. PATENT DOCUMENTS

| | | | | |
|---|---|---|---|---|
| 2009/0240873 | A1* | 9/2009 | Yu .......................... | G06F 3/0608 711/103 |
| 2012/0210169 | A1* | 8/2012 | Coile .................. | G06F 11/2069 714/22 |
| 2015/0032928 | A1* | 1/2015 | Andrews ............. | G06F 13/4022 710/300 |

\* cited by examiner

*Primary Examiner* — Terrell S Johnson

(57) ABSTRACT

An apparatus comprises a memory slot mounted to a main board, an expansion slot mounted to the main board and electrically coupled to the memory slot, a backup power module receivable in the expansion slot, and a main power source electrically coupled to the expansion slot and the memory slot. During normal operation, the main power source supplies electrical power to the memory slot and charge the backup power module. In the event of power loss or main power source failure, the backup power module discharges electrical power to the memory slot.

20 Claims, 10 Drawing Sheets

POWER SUPPLY APPARATUS, BACKUP POWER MODULE AND METHOD FOR PROVIDING BACKUP POWER IN COMPUTING SYSTEMS

TECHNICAL FIELD

Disclosed herein relates to a power supply apparatus, backup power module and method for providing backup power, and in particular, to a backup power supply apparatus, backup power module and power supply method for providing backup power in computing systems.

BACKGROUND

Memory modules used in computing systems such as Non-Volatile Dual In-circuit Memory Module (NVDIMM) comprises both volatile memory which is faster in data processing and non-volatile memory capable of retaining its contents after electrical power is removed. During operation of computing devices, the volatile memory is used to perform normal operations, and in the event of an unexpected power loss, volatile memory dumps its contents into the non-volatile memory using an on-board backup power source to store the data from the volatile memory.

Conventional backup power supply units in computer systems occupy the space reserved for hard disk drives to house batteries or supercapacitors, with cables connecting each of the backup power supply unit to a memory slot. Such backup power supply units have very limited power supply capacity due to the constraint of the hard disk drive space available. In addition, by utilizing the hard disk drive space, the backup power supply units reduce the data storage capacity of the computer systems. It is therefore desirable to provide a backup power supply which is capable of supplying backup power to a computing system with relatively higher power capacity and without compromising the data storage capacity in computer systems.

SUMMARY

In one aspect, the present disclosure provides an apparatus comprising a first device slot mounted to a main board, a second device slot mounted to the main board and electrically coupled to the first device slot, a backup power module receivable in the second device slot, and a main power source electrically coupled to the first device slot and the second device slot. During normal operation, the main power source supplies electrical power to the first device slot and charges the backup power module. In the event of power loss or main power source failure, the backup power module discharges electrical power to the first device slot and charges the backup power module received in the second device slot.

In another aspect, the present disclosure provides an apparatus having a backup power module in a PCI/PCIe form factor. The backup power module has a circuit board having a terminal and at least one power storage device coupled to the circuit board. The circuit board is connectable to a device slot of a main board of a host system via a terminal of the circuit board. In the event of a power loss, the backup power module is triggered to supply electrical power to the host system.

In a further aspect, a method includes detecting a power loss status of a host system, and activating a backup power module received in a device slot of a main board of a host system, in order to supply electrical power to the host system.

DETAILED DESCRIPTION

Figure 1:
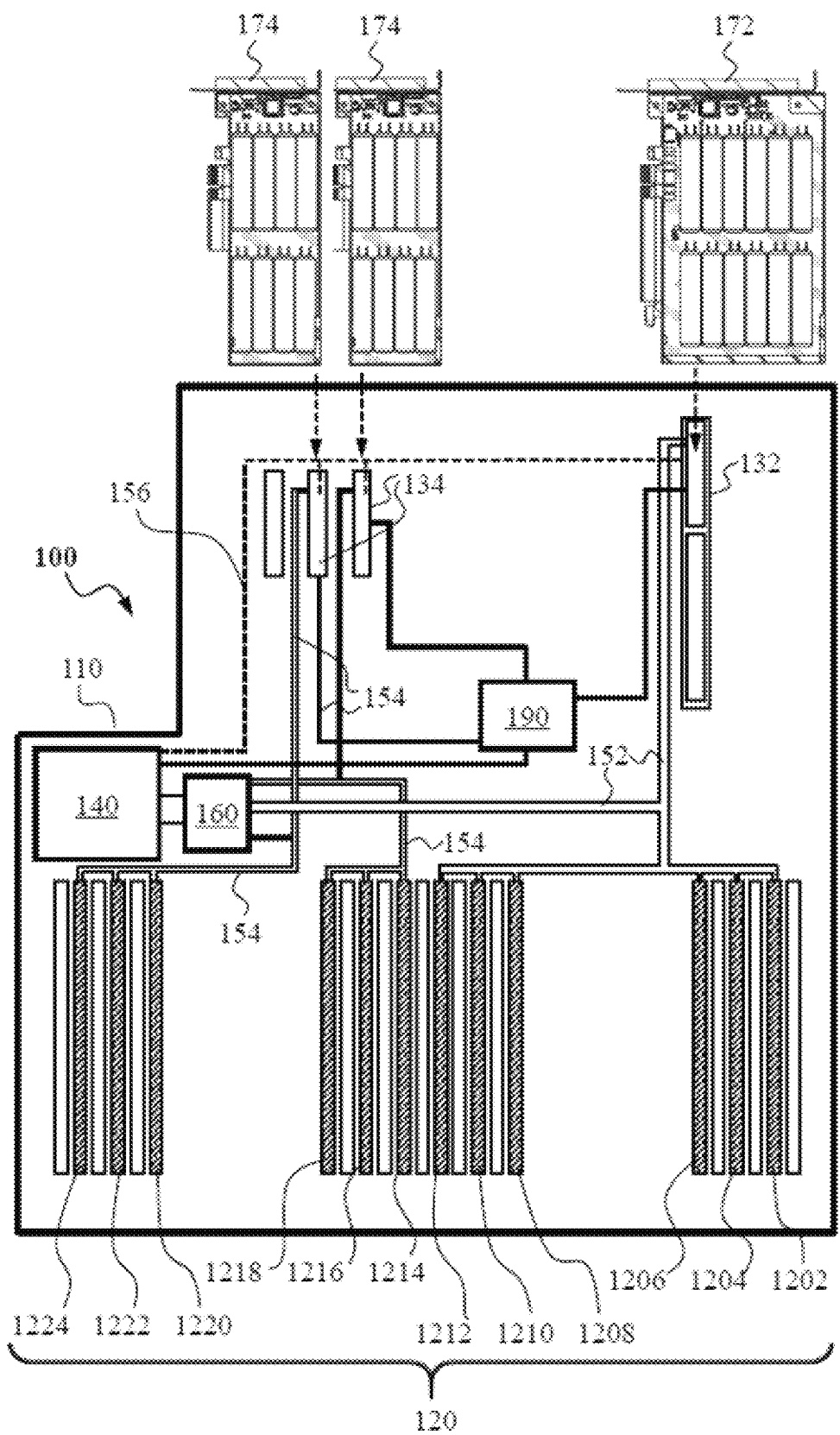
FIG. 1 is a schematic diagram of a power supply apparatus according to one embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, some or all known structures, materials, or operations may not be shown or described in detail to avoid obfuscation.

Performance reliability in computing systems or servers is one key component in the procurement of servers. One important factor of system and server reliability lies in the ability to retain critical information or data at times of power outage. Retaining such information or data at times of power outage lies in the ability to transfer the information from the random access memory to a stable medium, such as non-volatile memory, in the event of sudden power outage.

In one aspect, the present disclosure provides a power supply apparatus for use in a host device, such as a computing system or server. As shown in FIGS. 1, 2A, 2B, 3A, 3B, 4A and 4B, the power supply apparatus 100 includes a main board 110, a plurality of first device slots (shown as memory slots 120 as one example) and a plurality of second device slots (shown as expansion slots 132 and 134 as one example) coupled to the memory slots 120 and mounted to the main board 110, and a main power source 140 electrically coupled to the memory slots 120 and the expansion slots 132 and 134.

Each memory slot 120 is configured to receive a memory card therein, such as an NVDIMM card 122 (see FIG. 2B), which is referred to in this context as one type of load of a host system to which electrical power is supplied. The plurality of expansion slots 132 and 134 are Peripheral Component Interconnect (PCI)/Peripheral Component Interconnect Express (PCIe) slots, for example, expansion slots 132 are configured to be in compliance with Full-Height-Half-Length PCI/PCIe form factor (FHHL-PCI/PCIe), and expansion slots 134 are configured to be in compliance with Low-Profile-Half Length PCT/PCIe form factor (LPHL PCI/PCIe). This means that the expansion slots 132 may be slots purely of PCI type or PCIe type, or of both PCI and PCIe types. One or more of the FHHL-PCI/PCIe expansion slots 132 are each configured to receive a backup power module 172 of FHHL PCI/PCIe form factor, and one or more of the LPHL PCI/PCIe expansion slots 134 are each configured to receive a backup power module 174 of LPHL PCI/PCIe form factor.

Figure 4A:
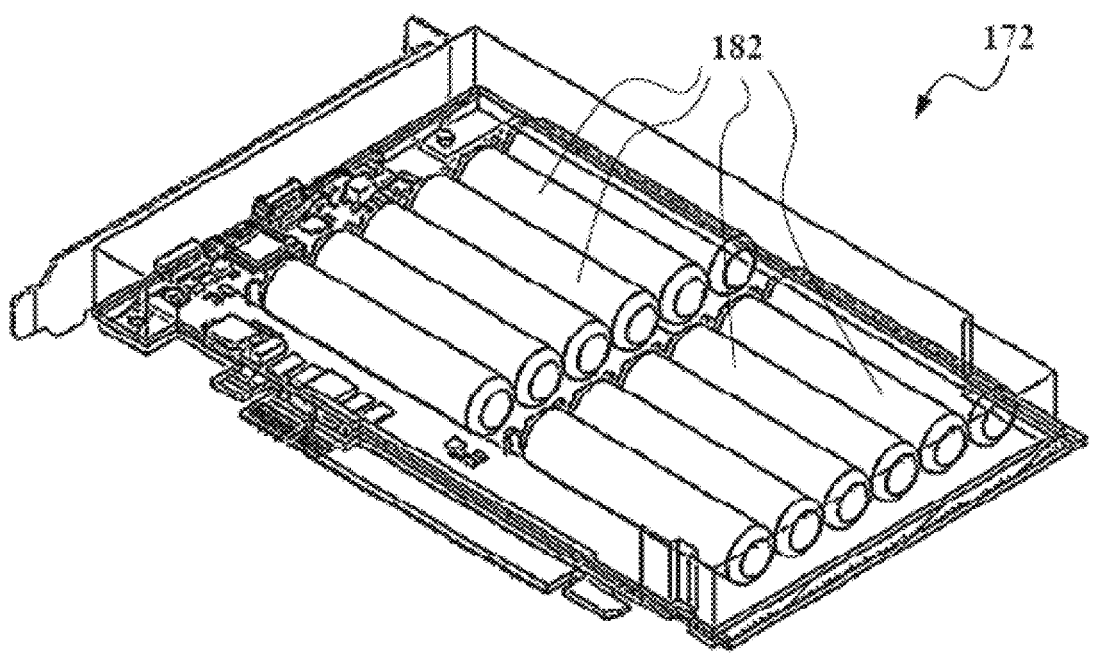
FIG. 4A is a perspective view of a first type of backup power unit used in the apparatus shown in FIG. 3A.
Figure 4B:
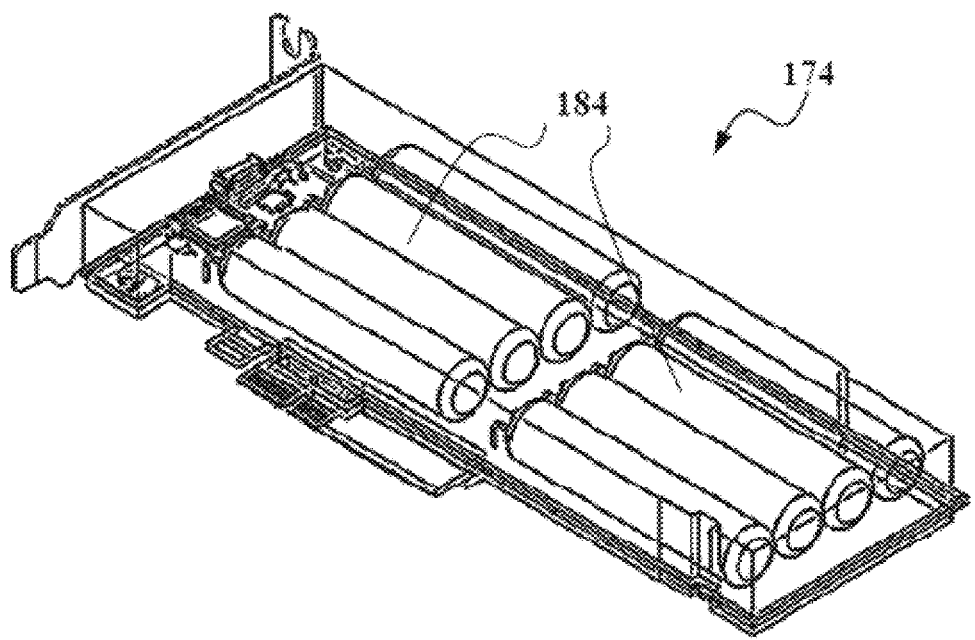
FIG. 4B is a perspective view of a second type of backup power unit used in the apparatus shown in FIG. 3A.

Shown in FIGS. 4A and 4B as an example, each FHHL-PCI/PCIe backup power module 172 is capable of housing one or more power storage device. In the embodiment shown in FIGS. 4A and 4B, up to twelve supercapacitors 182 that are mounted to a circuit board (shown as a PCI/PCIe card 172) and each LPHL-PCI/PCIe backup power module 174 is capable of housing up to eight supercapacitors 184 that are mounted to a circuit board (shown as a PCI/PCIe card 174). It should be appreciated that the supercapacitors 182, 184 may be mounted to any other circuit board besides the PCI/PCIe card 172 and 174. Each PCI/PCIe card 172 and 174 has a terminal and a signal receiver coupled to the supercapacitors 182 and 184. The circuit board is connectable to the device slot 132 and 134 of the main board 110 through the terminal (see FIG. 1).

Apparatus 100 includes a power switch 160 mounted to the main board 110, and printed circuits 152, 154 and 156 formed to the main board 110, such as printed circuits on the external surfaces or inner layers of the main board 110. Printed circuits 152 and 154 are configured as power transmission circuits, for example, printed circuits 152 and 154 are connected to the same 12V power plane on the main board 110 to which the memory slots 120 are electrically coupled. Printed circuits 152 electrically connect one or more of the memory slots 120 to the main power source 140, the power switch 160 and the expansion slots 132. Likewise, printed circuits 154 electrically connect one or more of the memory slots 120 to the main power source 140, the power switch 160 and the expansion slots 134. Printed circuits 156 are configured as signal transmission circuits and coupled between the main power source 140 and the expansion slots 132 and 134.

Figure 2A:
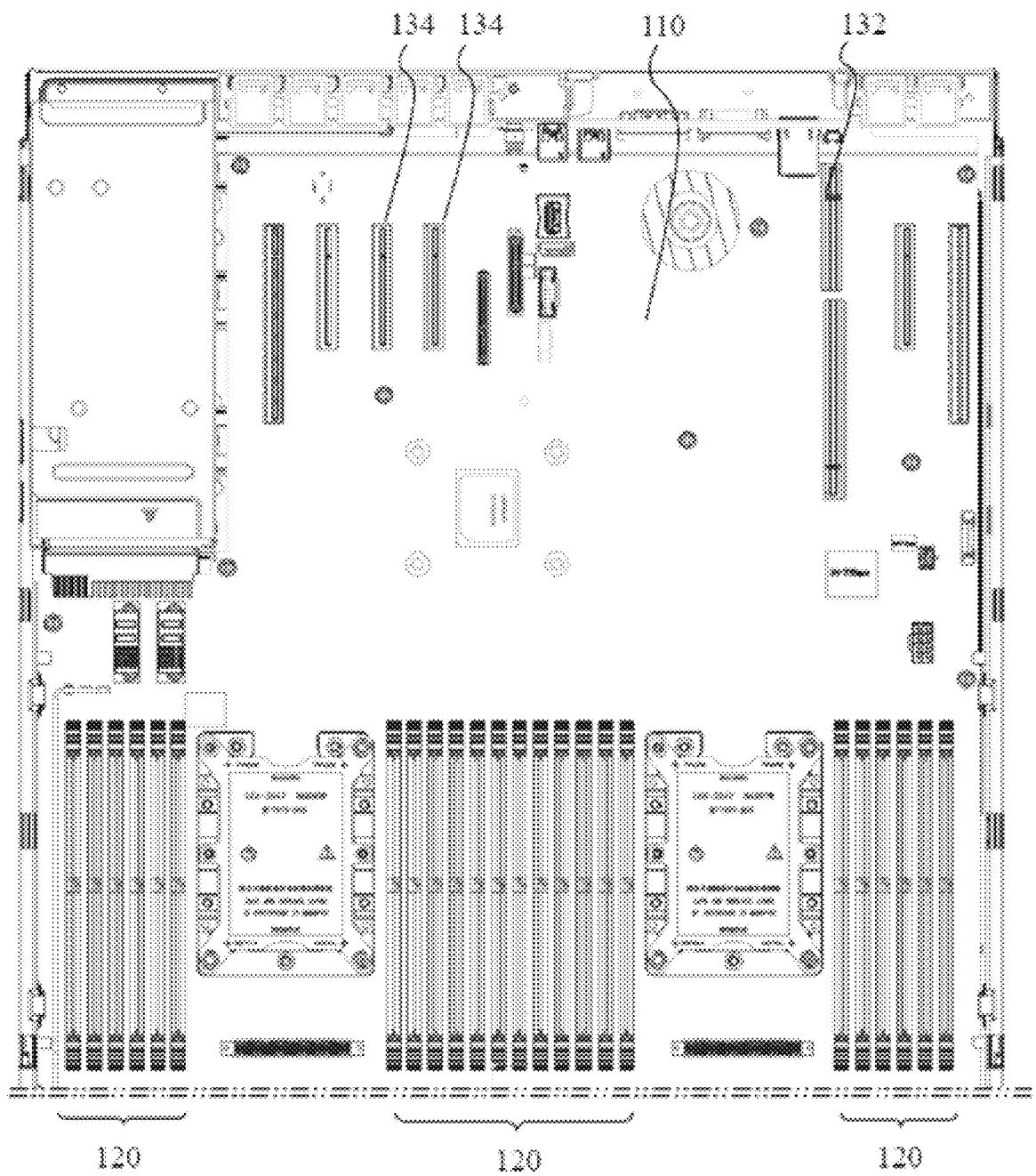
FIG. 2A is a top view of the power supply apparatus of FIG. 1 before backup power units are assembled.
Figure 2B:
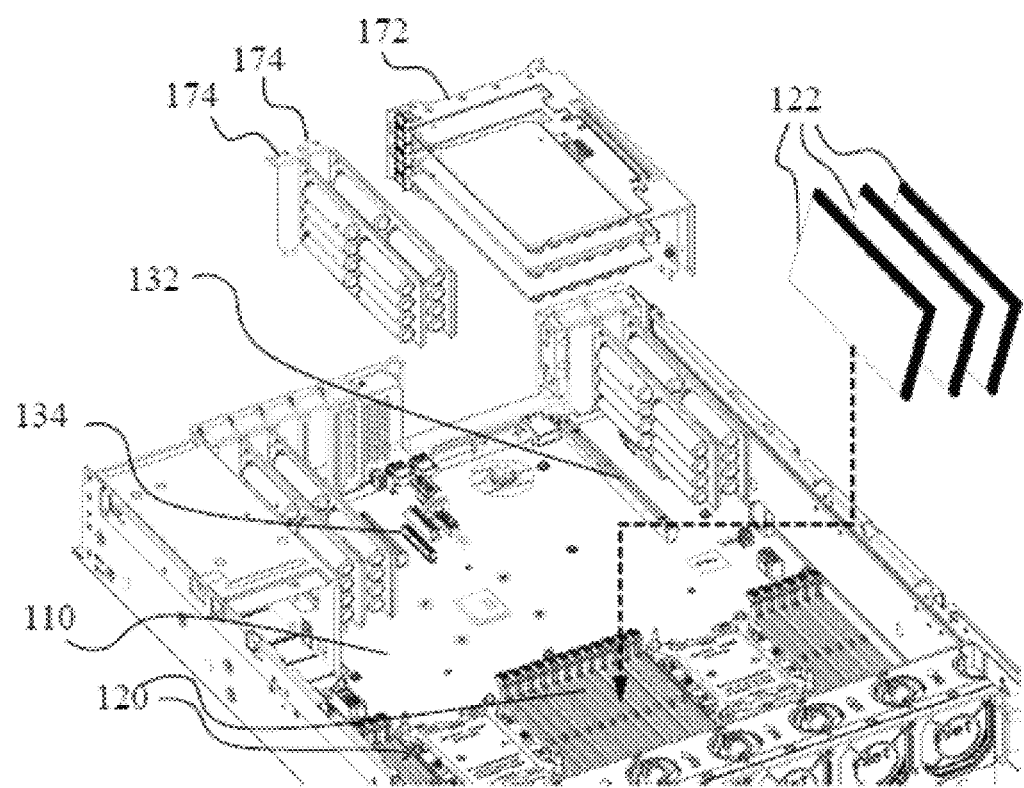
FIG. 2B is a top view of a power supply apparatus of FIG. 1 after backup power units are assembled.
Figure 3A:
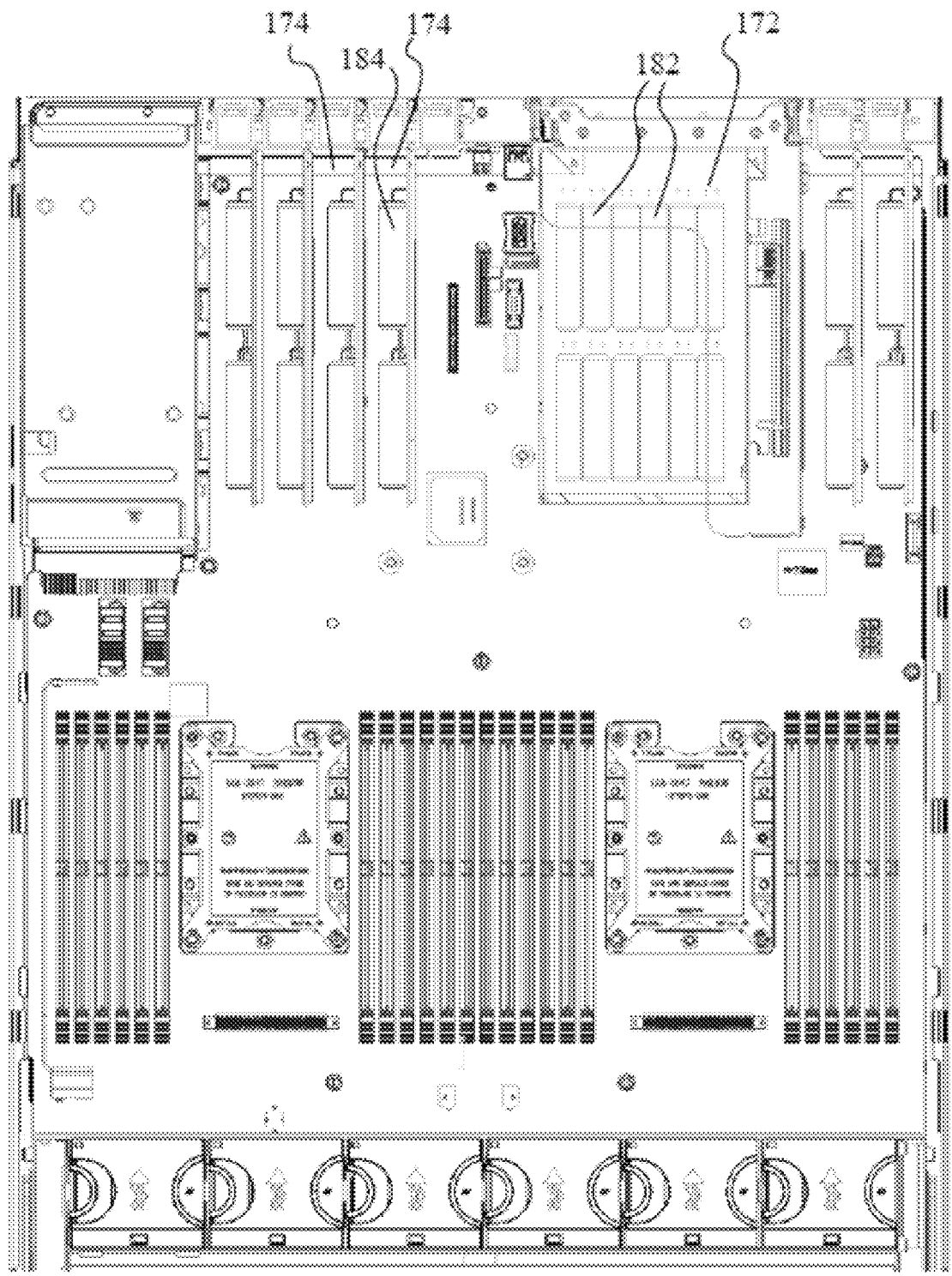
FIG. 3A is a perspective view of FIG. 2A.
Figure 3B:
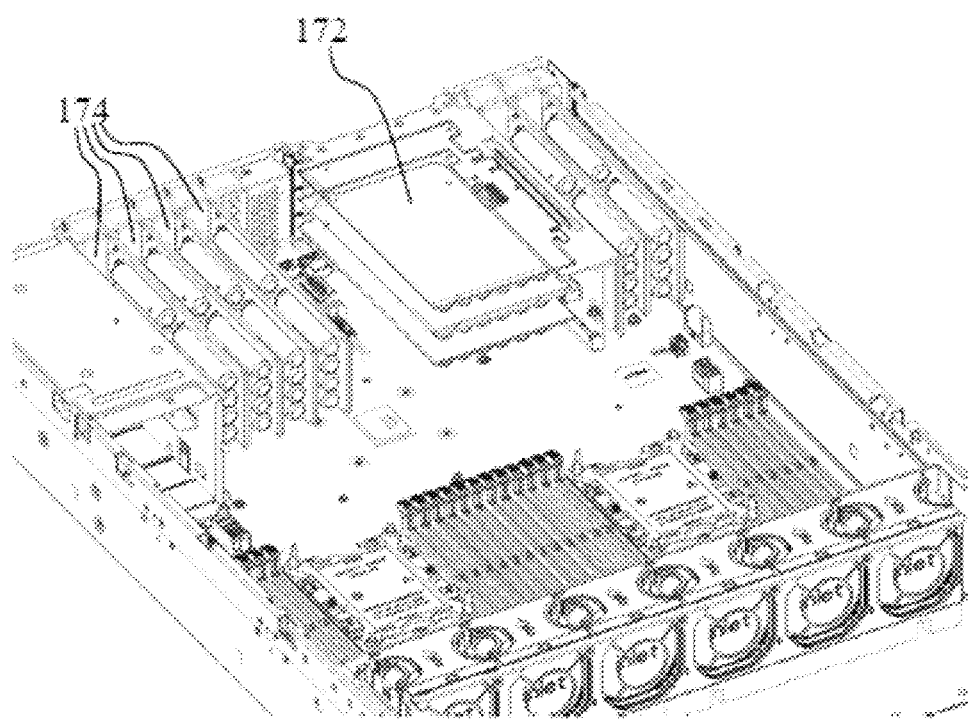
FIG. 3B is a perspective view of FIG. 2B.

The power switch 160 is configured, in normal operation of a host system during which the main power source continually supplies electrical power, to cause electrical power to be supplied from the main power source 140 to the memory slots 120 in order to support normal operation of memory cards such as NVDIMM cards 122 inserted in the memory slots 120 (see FIG. 2B). Meanwhile, the power switch 160 causes the electrical power to be supplied from the main power source 140 to the backup power modules 172 and 174 inserted in the respective expansion slots 132 and 134, to charge the supercapacitors 182 and 184 on the backup power modules 172 and 174.

In the event of system power failure, for example an unexpected power interruption, the main power source 140 sends a power loss message to the backup power modules 172 and 174, via printed circuits 156. Upon receipt of the power loss message by a signal receiver of the backup power modules 172 and 174, the backup power modules 172 and 174 are triggered to discharge electrical power to the NVDIMM cards 122. Being supplied with electrical power from the backup power modules 172 and 174 in a continuous manner as though from the main power source 140, the NVDIMM cards 122 will perform a data saving operation from the volatile memory to the non-volatile memory and, accordingly, avoids system data loss due to main power source failure or interruption.

Based on specific configuration and performance requirements of the host device, one or more or all of the expansion slots 132 and 134 may be configured to receive backup power modules 172 and 174, and the remaining expansion slots may be configured to retain the original function of standard PCI/PCIe expansion slots. Expansion slots 132 and 134 configured to receive backup power modules 172 and 174 are therefore capable of supplying electrical power to one or more of the NVDIMM cards 122 inserted in the respective memory slots 120.

In the embodiment shown in FIG. 1, one of the FHHL-PCI/PCIe expansion slots 132 is configured to receive a FHHL-PCI/PCIe backup power module 172, and two of the LPHL-PCI/PCIe expansion slots 134 are configured to receive a LPHL-PCI/PCIe backup power module 174.

With twelve supercapacitors 182 coupled thereon, the FHHL-PCI/PCIe backup power module 172 is capable of providing backup electrical power to six memory slots 1202, 1204, 1206, 1208, 1210 and 1212. With eight supercapacitors 184 coupled hereon, the first LPHL-PCI/PCIe backup power module 174 is capable of providing backup electrical power to three memory slots 1214, 1216, 1218, and the second LPHL-PCI/PCIe backup power module 174 is capable of providing backup electrical power to up to another three memory slots 1220, 1222, 1224.

Apparatus 100 may further include a Baseboard Management Controller (BMC) 190 mounted to the main board 110. BMC 190 is electrically coupled to the main power source 140 and the expansion slots 132 and 134 configured to receive backup power modules 172 and 174. BMC 190 is configured to determine a working status of the backup power modules 172 and 174, for example to check the status of the backup power modules 172 and 174 upon the system powering on. The status check may include detecting the presence of the backup power modules 172 and 174 in expansion slots 132 and 134, initiating a self-diagnostic by each of the backup power modules 172 and 174 to determine the health of each backup power modules 172 and 174, and sending a respective command to the system for a predetermined action, e.g. replacement of a faulty backup power module, etc.

Figure 5A:
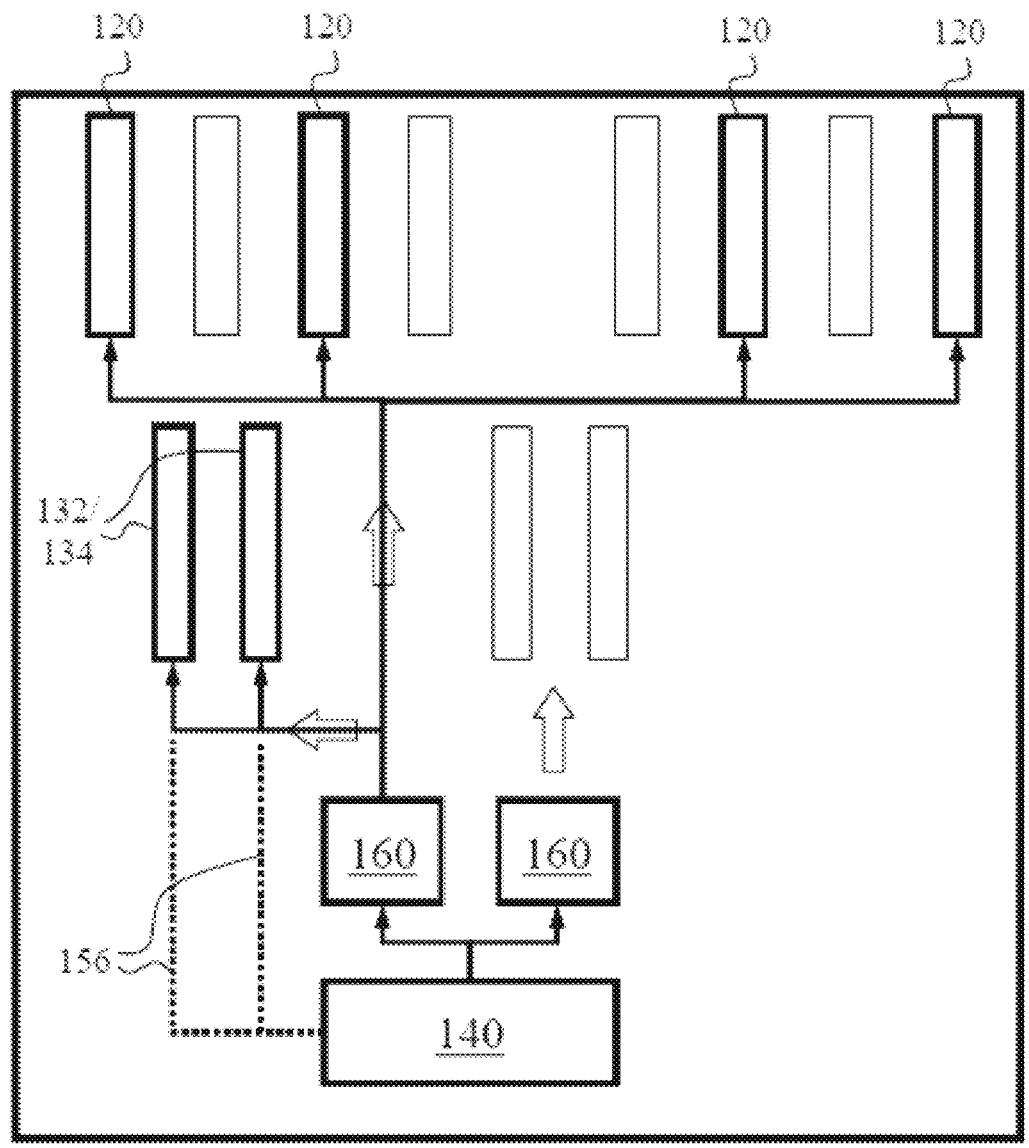
FIG. 5A is a schematic diagram showing an operation of the power supply apparatus of FIG. 1 before power loss.

During the normal operation of a host device, as shown in FIG. 5A, the main power source 140 supplies electrical power to the loads of the host device, for example, the NVDIMM memory cards 122 inserted in the memory slots 120, to support operation of the NVDIMM memory cards 122. The main power source 140 in the meantime charges the supercapacitors 182 and 184 on the backup power modules 172 and 174 located in the PCI/PCIe slots 132 and 134. Power switches 160 are coupled between the main power source 140, each of the PCI/PCIe slots 132 and 134, and each of the memory slots 120. The power switches 160 control the power supply from the main power source 140 to the memory slots 120 for the operation of NVDIMM memory cards 122, and to the PCI/PCIe slots 132 and 134 for charging the supercapacitors 182 and 184 on the backup power modules 172 and 174.

Figure 5B:
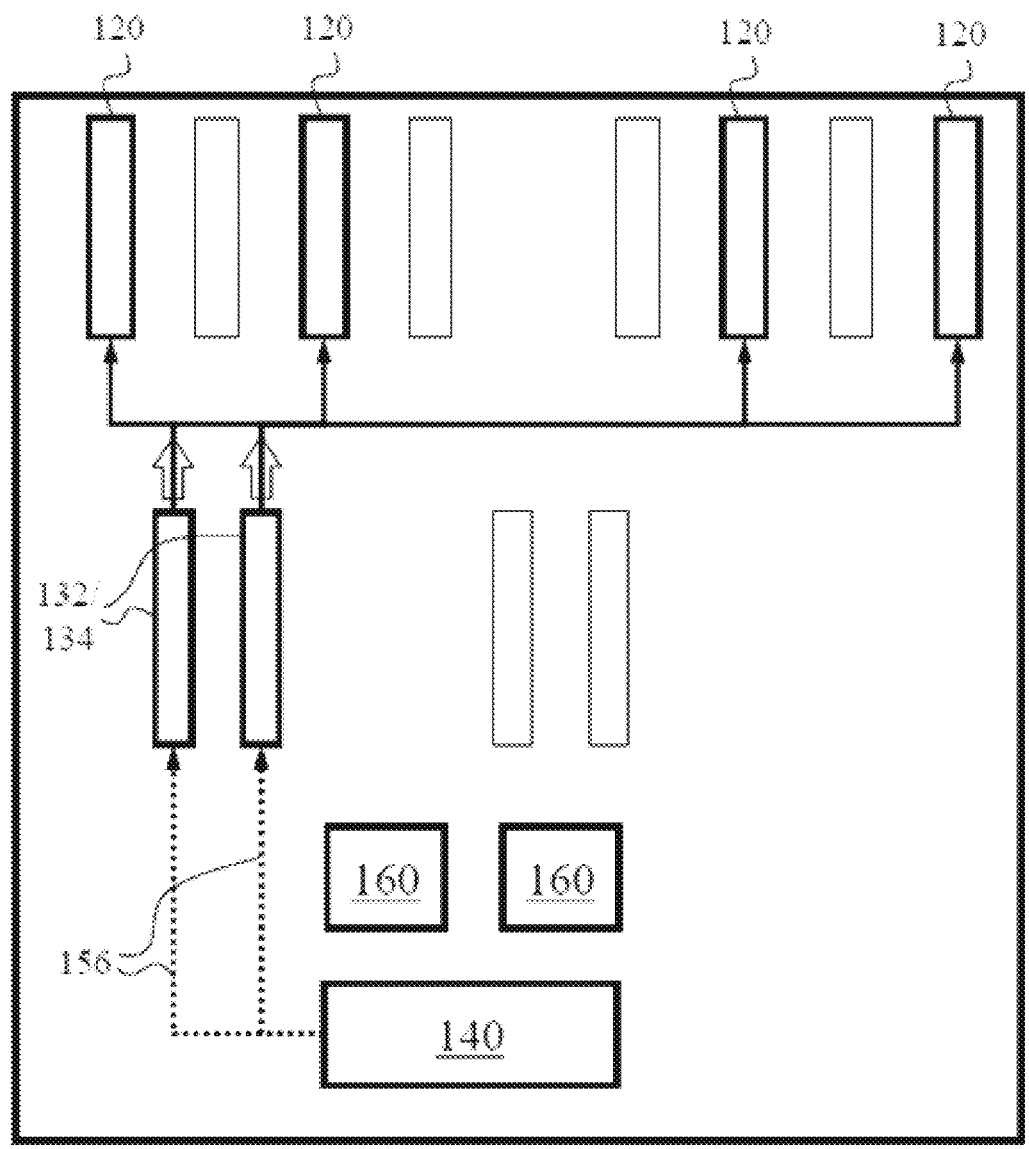
FIG. 5B is a schematic diagram showing an operation of the power supply apparatus of FIG. 1 after power loss.

In the event of system power loss, as shown in FIG. 5B, the main power source 140 sends a power loss message to the PCI/PCIe slots 132 and 134, via signal circuits 156. Triggered by the power loss message, the backup power modules 172 and 174 in the PCI/PCIe slots 132 and 134 start to discharge electrical power to the memory cards inserted in the memory slots 120, to allow data saving in the memory cards from the volatile memory to the non-volatile memory and accordingly, system data loss due to main power source interruption is avoided. Alternatively, upon detection of a system power loss, the backup power modules 172 and 174 discharge electrical power to the memory cards.

Figure 6:
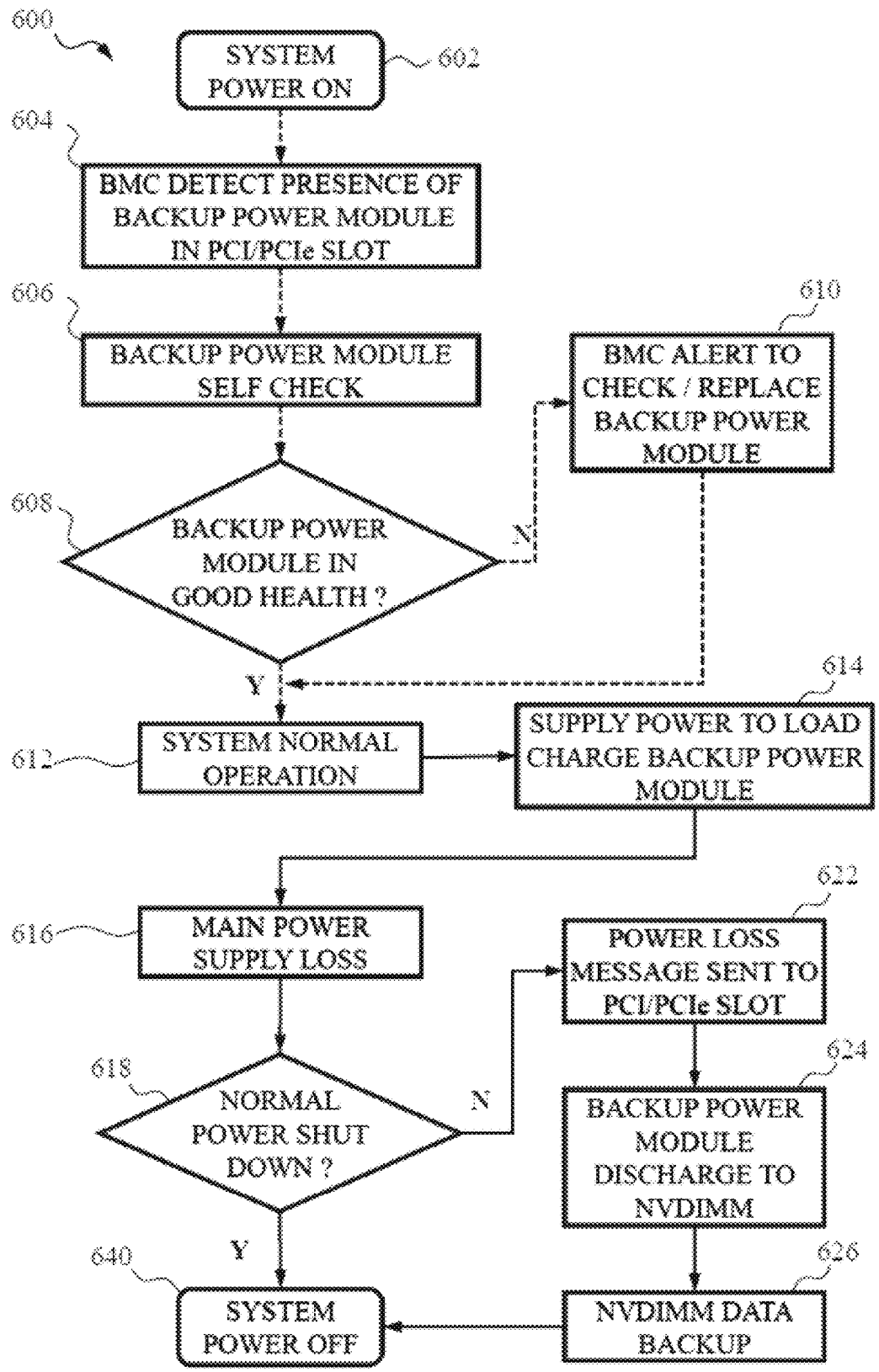
FIG. 6 is a flow chart showing a method for providing backup power according to one embodiment.

In another aspect, the present disclosure provides a power supply method 600 for use in a host system, such as a computing system or server, as shown in FIG. 6. Upon system power on at block 602, the BMC detects the presence of backup power modules in the PCI/PCIe slots at block 604. At block 606, the backup power modules perform self-diagnostics and self-checks to determine, at block 608, if the backup power modules are in good health. If "yes" (Y), the system proceeds to normal operation at block 612. If "not" (N), the BMC alerts an action to check or replace the backup power modules at block 610 and upon completion of the action, the system normal operation is resumed at block 612. During system normal operation, the main power source supplies electrical power to the loads of the system and the main power source supplies electrical power to charge the supercapacitors of the backup power modules at block 614.

In the event of system power loss at block 616, the system determines whether the power loss is under normal power shut down at block 618. If "yes" (Y), the system proceeds to power off as usual at block 640. If "not" (N), the main power source 140 sends a power loss message to the PCI/PCIe slots at block 622. Upon receipt of the power loss message, the backup power modules in the PCI/PCIe slots start to discharge electrical power to the NVDIMM cards in the memory slot at block 624. Being supplied with continuous power by the backup power modules, the system performs NVDIMM memory card data backup at block 626. Upon completion of NVDIMM memory card data backup, the system proceeds to power off at block 640.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

The invention claimed is:

1. A power supply apparatus comprising:
a first device slot mounted to a main board, the first device slot configured for receiving a memory device;
a second device slot mounted to the main board and electrically coupled to the first device slot;
a backup power module receivable in the second device slot, the backup power module configured to provide electrical power to the first device slot; and
a main power source electrically coupled to the first device slot and the second device slot, the main power source configured to supply power to the first device slot and charge the backup power module received in the second device slot.

2. The power supply apparatus of claim 1, further comprising a power switch coupled to the main power source, the first device slot and the second device slot, wherein the power switch is configured to cause the main power source to supply electrical power to the first device slot, charge the backup power module received in the second device slot, and cause the backup power module to discharge electrical power to the first device slot upon the main power source failing to supply electrical power.

3. The power supply apparatus of claim 1, further comprising a signal circuit coupled between the main power source and the second device slot, wherein the main power source is configured to send a power loss message via the signal circuit to the second device slot upon failure of the main power source to discharge electrical power from the backup power module to the first device slot.

4. The power supply apparatus of claim 1, further comprising a baseboard management controller coupled to the main power source and the second device slot, wherein the baseboard management controller is configured to determine a working status of the backup power module.

5. The power supply apparatus of claim 1, further comprising a printed circuit formed to the main board and coupled to the first device slot and the second device slot, wherein the backup power module provides electrical power to the first device slot through the printed circuit.

6. The power supply apparatus of claim 5, wherein the printed circuit is formed to the main board at a power plane to which the first device slot is electrically coupled.

7. The power supply apparatus of claim 5, wherein the printed circuit further comprises a signal circuit coupled to the main power source and the second device slot, wherein the main power source is configured to send a power loss message via the signal circuit to the second device slot upon failure of the main power source to discharge electrical power from the backup power module to the first device slot.

8. The power supply apparatus of claim 1, wherein the second device slot is a peripheral component interconnect slot.

9. The power supply apparatus of claim 8, wherein the backup power module includes peripheral component interconnect card and a plurality of supercapacitors mounted to the peripheral component interconnect card, wherein the supercapacitors are configured to be charged by the main power source and to discharge electrical power from the backup power module to the first device slot.

10. A backup power module comprising:
a circuit board having a terminal; and
at least one power storage device coupled to the circuit board;
wherein the circuit board is connectable to a device slot of a main board of a host system via the terminal of the circuit board; and wherein the at least one power storage device is operative to supply electrical power to a load of the host system coupled to the device slot upon a power loss to the host system.

11. The backup power module of claim 10, wherein the power storage device is configured to be electrically connectable to a main power source coupled to the backup power module to be charged by the main power source.

12. The backup power module of claim 11, further comprising a signal receiver coupled to the power storage device to activate the power storage device to supply power to the load upon receipt of a power loss message from the main power source.

13. The backup power module of claim 11, configured to be electrically connectable to the main power source and the load through a switch, wherein the backup power module is configured to electrically connect with the main power source to charge the power storage device when the main power source continue supplies electrical power, and to activate the backup power module to supply power to the load upon the main power source power failure occurs.

14. The backup power module of claim 11, wherein the backup power module is configured to receive a power loss message from the main power source via a signal circuit.

15. The backup power module of claim 11, configured to be connectable to a baseboard management controller coupled to the main power source and the device slot to provide a working status of the backup power module received in the device slot.

16. The backup power module of claim 11, wherein the load includes an non-volatile dual in-circuit memory module card inserted into the memory slot, wherein the backup power module is to provide electrical power to the non-volatile dual in-circuit memory module card through a power circuit connected between the device slot and the memory slot.

17. The backup power module of claim 10, wherein the device slot is a peripheral component interconnect expansion slot mounted to the main board, wherein the backup power module is configured to be received in the peripheral component interconnect expansion slot and electrically connected to a memory card slot mounted to the main board.

18. A method for providing backup power to a host system comprising:
   detecting a power loss status of the host system;
   activating a backup power module, the backup power module being received in a device slot of the host system, in order to supply electrical power to a load of the host system,
   wherein the backup power module comprises a circuit board having a terminal; and at least one power storage device coupled to the circuit board; wherein the circuit board is connectable to the device slot of the host system via the terminal of the circuit board; and wherein the at least one power storage device is operative to supply electrical power to the load of the host system coupled to the device slot upon a power loss to the host system.

19. The power supply method of claim 18, wherein detecting the power loss status comprises differentiating the power loss status from a normal shut down status of the host system.

20. The power supply method of claim 18, wherein activating the backup power module comprises receiving a power loss message from a main power source coupled to the load and the backup power module.

* * * * *